US008615651B1

(12) United States Patent
Modadugu et al.

(10) Patent No.: US 8,615,651 B1
(45) Date of Patent: Dec. 24, 2013

(54) OFFLINE SHARED SECURITY KEY CALCULATION

(75) Inventors: Nagendra Modadugu, San Francisco, CA (US); Bennet Yee, Mountain View, CA (US)

(73) Assignee: Google Inc., Mountain View, CA (US)

( * ) Notice: Subject to any disclaimer, the term of this patent is extended or adjusted under 35 U.S.C. 154(b) by 456 days.

(21) Appl. No.: 12/781,508

(22) Filed: May 17, 2010

(51) Int. Cl.
*H04L 29/06* (2006.01)
*H04L 9/32* (2006.01)

(52) U.S. Cl.
USPC .......................................... 713/151; 713/168

(58) Field of Classification Search
USPC ....................................................... 713/151
See application file for complete search history.

(56) References Cited

U.S. PATENT DOCUMENTS

| | | | | |
|---|---|---|---|---|
| 7,039,946 | B1 * | 5/2006 | Binding et al. | 726/3 |
| 7,565,324 | B2 * | 7/2009 | Vincent | 705/50 |
| 7,870,380 | B2 * | 1/2011 | VanHeyningen et al. | 713/151 |
| 2006/0174103 | A1 * | 8/2006 | Verma et al. | 713/151 |
| 2007/0192842 | A1 * | 8/2007 | Beaulieu et al. | 726/9 |
| 2009/0172394 | A1 * | 7/2009 | Johnston et al. | 713/160 |
| 2010/0202455 | A1 * | 8/2010 | Sundaram et al. | 370/392 |
| 2010/0211780 | A1 * | 8/2010 | Mukkara et al. | 713/168 |
| 2010/0296481 | A1 * | 11/2010 | Weniger et al. | 370/331 |
| 2011/0159848 | A1 * | 6/2011 | Pei et al. | 455/411 |

\* cited by examiner

*Primary Examiner* — Carolyn B Kosowski
*Assistant Examiner* — Jason C Chiang
(74) *Attorney, Agent, or Firm* — Fish & Richardson P.C.

(57) ABSTRACT

Methods, systems, and apparatus, including computer programs encoded on a computer storage medium, for offline shared security key calculation. In one aspect, a method includes entering a first secure communication session with a remote device. A plurality of nonces are provided to the remote device during the first secure communication session. The first secure communication session is exited. A communication is received from the remote device after exiting the first communication session. The communication includes an indication of one of the plurality of nonces. A session key is generated using the indicated one of the plurality of nonces. A second secure communication session is entered with the remote device using the generated session key. Other embodiments of this aspect include corresponding systems, apparatus, and computer programs, configured to perform the actions of the methods, encoded on computer storage devices.

15 Claims, 4 Drawing Sheets

OFFLINE SHARED SECURITY KEY CALCULATION

BACKGROUND

This specification relates to secure communications between network devices.

Devices connected through a network can enter into secure communication sessions. For example, Transport Layer Security (TLS) or Secure Sockets Layer (SSL) protocols can be used to facilitate secure communications sessions between the devices. Communications between the devices can be encrypted and transmitted across the network. In some instances, secure communications can be intercepted and recorded by third party devices. These recorded communications can be transmitted by the third party devices during future communication sessions as part of a replay attack by the third party devices.

SUMMARY

In general, in one aspect, embodiments feature entering a first secure communication session with a remote device. A plurality of nonces are provided to the remote device during the first secure communication session. The first secure communication session is exited. A communication is received from the remote device after exiting the first communication session. The communication includes an indication of one of the plurality of nonces. A session key is generated using the indicated one of the plurality of nonces. A second secure communication session is entered with the remote device using the generated session key. Other embodiments of this aspect include corresponding systems, apparatus, and computer programs, configured to perform the actions of the methods, encoded on computer storage devices.

These and other embodiments can each optionally include one or more of the following features. A determination as to if the indicated nonce is valid can be made before entering the second secure communication session. Determining if the indicated nonce is valid can include determining if the indicated nonce has been used in a previous communication session and identifying the indicated nonce as a valid nonce if the indicated nonce has not been used in a previous communication session. Determining if the indicated nonce has been used in a previous communication session can include determining if the indicated nonce is in a collection of previously indicated nonces. The indication of the one of the plurality of nonces can be the one of the plurality of nonces. The indication of the one of the plurality of nonces can be a nonce ID associated with the one of the plurality of nonces. The second secure communication session can be a Secure Sockets Layer (SSL) communication session. The second secure communication session can be a Transport Layer Security (TLS) communication session.

In general, in another aspect, embodiments feature receiving a plurality of encryption codes from a computing device. One of the plurality of encryption codes is selected. A first communication is encrypted using a first session key generated using the selected one of the plurality of encryption codes. A communication session is initiated with the computing device by transmitting the encrypted first communication to the computing device. An indication of the selected one of the plurality of encryption codes I provided to the computing device. Other embodiments of this aspect include corresponding systems, apparatus, and computer programs, configured to perform the actions of the methods, encoded on computer storage devices.

These and other embodiments can each optionally include one or more of the following features. The indication of the selected one of the plurality of encryption codes can be transmitted along with the encrypted first communication. The indication of the one of the plurality of encryption codes can be the one of the plurality of encryption codes. The indication of the one of the plurality of encryption codes can be an encryption code ID associated with the one of the plurality of encryption codes. A communication can be received from the computing device wherein the received communication has been encrypted using the first session key generated using the selected one of the plurality of encryption codes. A communication can be received from the computing device wherein the received communication has been encrypted using a second session key generated using the selected one of the plurality of encryption codes that is different from the first session key. An indication of a second encryption code that is not one of the plurality of encryption codes can be received from the computing device. The first communication can be re-encrypted using a second session key generated using the second encryption code. The re-encrypted first communication can be transmitted to the computing device. A third encryption code can be transmitted to the computing device. The communication session can be a Secure Sockets Layer (SSL) communication session. The communication session can be a Transport Layer Security (TLS) communication session.

Particular embodiments of the subject matter described in this specification can be implemented so as to realize one or more of the following advantages. Communications between devices connected over a network can be protected from replay attacks. Secure communication sessions can be established with minimal initiation, or handshake, communications. Delay in initiating a communication session can be reduced. This can be especially helpful for communications that require high bandwidth and relatively quick communication speeds, such as, for example, real time voice communications. The validity of pre-distributed nonces can be determined.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
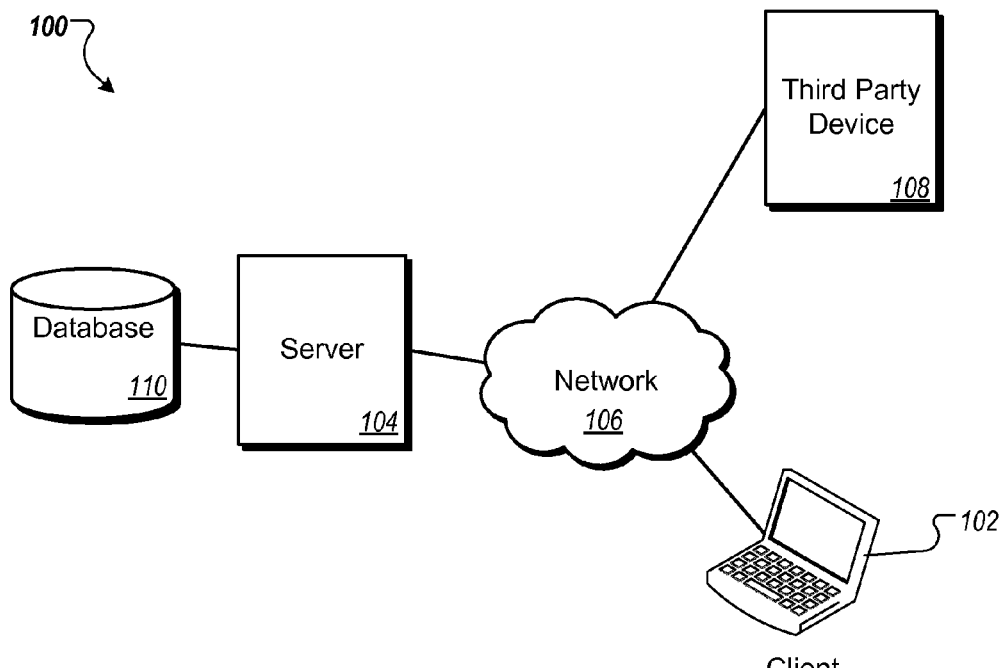
FIG. 1 shows an example system for facilitating secure communications between network devices.

FIG. 1 shows an example system 100 for facilitating secure communications between a client device 102 and a server 104. The client device 102 communicates with the server 104 through a network 106 (e.g., the Internet, a LAN, or a WAN).

The client device 102 can be, for example, a personal computer (e.g., desktop or laptop), a mobile device (e.g., smart phone or personal digital assistant (PDA)), a web enabled television, or a telephone (e.g., a voice over IP (VoIP) enabled phone). The server 104 can be, for example, a web server (e.g., for supplying web pages), an e-mail server, or an FTP server. In some alternative implementations, the server can be an end user device, such as a personal computer, mobile device, web enabled television, or telephone.

The client device 102 can initiate a first secure communication session with the server 104 by transmitting an initial communication to the server 104 through the network 106. In some implementations, the first secure communication session can be a Transport Layer Security (TLS) communication session, a Secure Sockets Layer (SSL) communication session, or a communication session the implements another security protocol. The initial communication can include communication session initiation information. The communication session initiation information can include, for example, a device ID for the client device 102 (e.g., an IP address or hardware ID), a first nonce, and/or a session ID for the first communication session. The first nonce is a value (e.g., a numeric value) that is unique to the first communication session. The first nonce is intended to be used only for the first communication session. In some implementations, the first nonce is a random value. The first nonce can be used to generate a session key for the first communication session. In some implementations, the session ID can be a unique session ID for the first communication session. In other implementations, the session ID can have a zero or null value to indicate to the server that a new session ID is requested for the first communication session.

In some implementations, the communication session initiation information can include a list of compression methods and/or a list of encryption methods. The list of compression methods indicates to the server 104 the compression methods that are supported by the client device 102. The server 104 can select one of the indicated compression methods to use for communications transmitted during the first communication session. Similarly, the list of encryption methods indicates to the server 104 the encryption methods that are supported by the client device 102 (e.g., RSA with 3DES or RSA with IDEA). The server 104 can select one of the indicated encryption methods to use for communications transmitted during the first communication session.

The server 104 can respond to the initial communication received from the client device 102 with a response communication. The response communication can include, for example, a second nonce and a session ID. In some implementations, the second nonce is the same as the first nonce sent by the client device 102. In other implementations, the second nonce is different than the first nonce sent by the client device 102. In some implementations, the second nonce is a random value. The server 104 can provide the session ID in implementations in which the client device 102 has requested a session ID for the first communication session, for example, when the value for the session ID indicated by the client device 102 is null or zero. In implementations in which the client device 102 has indicated a list of compression methods and/or a list of encryption methods in the initial communication, the server 104 can indicate which compression and/or encryption methods have been selected for the first communication session in the response communication.

In some implementations, the client device 102 uses a public key associated with the server 104 to establish a master key for communications between the client device 102 and the server 104. Only the server 104 should be able to decipher communications encrypted using the public key of the server 104 since only the server 104 should have the private key required to decipher communications encoded using the server 104's public key. The client device 102 can provide the master key to the server 104. In some implementations, the client device 102 encrypts the master key using the server 104's public key before transmitting the master key to the server 104. In other implementations, the master key is generated by the server 104 using a public key associated with the client device 102. In such implementations, the server 104 can provide the master key to the client device 102. In some implementations, the master key is generated and shared prior to the first communication session. In some implementations, the master key is used for all communication session between the server 104 and the client device 102. In such instances, it may only be necessary to transmit the master key between the server 104 and the client device 102 once.

In some implementations, the client device 102 generates a session key for the first communication session using the master key and the second nonce provided by the server 104. In other implementations, the session key is generated using the first nonce and the master key. In still other implementations, both the first and second nonces as well as the master key are used to generate the session key. The nonces are used to version the master key in order to create a session key that is unique to the first communication session. The client device 102 uses the session key to encrypt future communications for the first communication session. Generating a new session key based on one or more nonces that are unique to the first communication session can ensure that the encryption used for the first communication session is unique to the first communication session and can not be used for future communication sessions between the server 104 and the client device 102.

In some implementations, the server 104 uses one or both of the first and second nonces in combination with the master key to also generate the session key. After the initial communication and the response communication have been sent and received, both the client device 102 and server 104 will have both the first and second nonces as well as the master key. This allows the server 104 to generate the same session key as the client device 102. The server 104 uses the session key to encrypt future communications for the first communication session.

In some implementations, using a different, unique session key for each communication session between the client device 102 and the server 104 can prevent a third party device 108 from conducting a replay attack. For example, if the client device 102 and server 104 use the same encryption key for each communication session, the third party device 108 can listen in on a communication session and record communications that are transmitted by the server 104, the client device 102, or both. In this example, the third party device 108 can then replay the recorded communications during a subsequent communication session in order to trick the server 104 into identifying the communications received from the third party device 108 as actually being received from the client device 102 (or vice-versa). This can potentially disrupt communications between the client device 102 and the server 104 since unwanted communications are being introduced into the communication session. Replay attacks can be prevented by using a session key that is generated using one or more nonces that are unique to a current communication session, since the server 104 and client device 102 would be able to recognize replayed communications sent by the third party device 108 as not being from the current communication session.

In some implementations, the server 104 provides the client device 102 with a set of nonces during the first communication session. Each nonce within the set of nonces is intended to be used in association with only one communication session. Each unique nonce in the set of nonces can be used to create a unique session key for a future communication session that is unique to that communication session. In some implementation, the client device 102 can obtain the set of nonces from a database 110. In other implementations, the nonces that make up the set of nonces are randomly generated by the server 104. The server 104 can then store the randomly generated nonces in the database 110.

The client device 102 can store the set of nonces in a local memory of the client device 102. The set of nonces is a collection of one or more nonces that can be used to generate session keys for future communication sessions between the server 104 and the client device 102. In some implementations, the number of nonces within the set of nonces is sufficiently large to allow session keys to be generated for future communication sessions between the client device 102 and server 104 without additional nonces being exchanged between the client device 102 and the server 104. For example, the set of nonces can include 10,000 nonces. In some implementations, the nonces are encoded using the session key for the first communication session before being transmitted to the client device 102.

Additional information aside from the set of nonces can be exchanged in communications between the client device 102 and the server 104 during the first communication session. After communications have been exchanged between the client device 102 and the server 104, the first communication session can be terminated. For example, the client device 102 can explicitly indicate to the server 104 that the first communication session is to be terminated. As another example, the client device 102 can terminate the first communication session by ending transmissions to the server 104. In this example, the server 104 can determine that the first communication session is terminated after not receiving a communication from the client device 102 for a predetermined time out period.

In some implementations, the client device 102 can send communications to the server 104 after the first communication session has terminated by initiating a second secure communications session. The second secure communication session can be, for example, a Transport Layer Security (TLS) communication session or a Secure Sockets Layer (SSL) communication session. The client device 102 can initiate the second communication session with the server 104 by selecting a nonce from the set of nonces and generating a second session key using the selected nonce. In some implementations, the client device 102 selects a nonce randomly from the set of nonces. In other implementations, the client device 102 selects nonces in a predetermined order. For example, the client device 102 can use nonces in the order that they are received from the server 104. As another example, the server 104 can indicate an order in which the nonces are to be used by the client device 102 (e.g., during the first communication session).

The client device 102 can encrypt a first communication using the second session key and transmit the first communication to the server 104. For example, if the client device 102 is a VoIP enabled phone, the first communication can be digitized voice data. The client device 102 can encrypt the digitized voice data using the second session key. As another example, the client device 102 is a laptop computer and a user of the client device 102 is attempting to send an e-mail communication. The first communication can include some or all of the e-mail. The client device 102 can use the second session key to encrypt the e-mail data that makes up the first communication.

In some implementations, the client device 102 includes an indication of the selected nonce with the first communication. For example, each nonce in the set of nonces can be associated with a nonce ID. The client device 102 can transmit the nonce ID of the selected nonce to the client device 102 along with the first communication. As another example, the client device 102 can transmit the selected nonce to the server 104 along with the first communication. As yet another example, the client device 102 can associate index numbers with each of the nonces in the set of nonces based on the order in which they are received from the server 104. The client device 102 can then provide the index number of the selected nonce to the server 104 in order to indicate the selected nonce. In some implementations, the indication of the selected nonce is transmitted separately from the first communication. For example, the client device 102 can transmit the indication of the selected nonce to the server 104 before transmitting the first communication to the server 104. In this example, the client device 102 can transmit the first communication to the server 104 before a response is received from the server 104.

In some implementations, the client device 102 makes a record of when a nonce from the set of nonces has been used to ensure that the nonce is not reused in a future communications session. For example, the client device 102 can include a look-up table of nonces in memory. The client device 102 can change the value of an indicator in the look-up table to indicate that a nonce has been used. As another example, the client device 102 can edit metadata associated with a nonce in order to indicate that the nonce has been used. In some implementations, the client device 102 can delete a nonce after it has been used to ensure that the nonce is not reused for a future communication session. In such implementations, the client device 102 can delete the nonce after the session key has been generated, or after a communication session associated with the nonce has terminated.

The server 104 receives the indication of the selected nonce from the client device 102. In implementations in which the indication of the selected nonce is the selected nonce, the server 104 can use the selected nonce to generate the second session key. In other implementations, the indication of the selected nonce is not the selected nonce, but rather an indicator associated with the selected nonce (e.g., the indication of the selected nonce is a nonce ID or index number associated with the selected nonce). In such implementations, the server 104 can access the database 110 to identify the selected nonce. For example, the set of nonces can be stored in the database 110 in a look-up table. The look-up table can include nonce IDs associated with each nonce. The server 104 can use a nonce ID received from the client device 102 to identify the selected nonce for the second communication session from the set of nonces. As another example, the look-up table can include index numbers associated with each nonce. The server 104 can identify the selected nonce using an index number received from the client device 102.

In some implementations, the database 110 is used to store a plurality of sets of nonces where each set of nonces is associated with a different client device that is capable of communicating with the server 104. Each set of nonces can be associated with a device ID for a client device (e.g., an IP address or hardware ID). In such cases, the client device 102 can include a device ID for the client device 102 along with the indication of the selected nonce. The server 104 can use the received device ID to identify a set of nonces associated with the client device 102. In some implementations, the server 104 can then use a nonce ID or index number associated with the client device 102 provided as the indication of the selected nonce to identify the selected nonce within the identified set of nonces.

In some implementations, upon identifying the selected nonce, the server 104 uses the selected nonce to generate the second session key. The server 104 can encrypt future communications for the second communication session using the second session key. Additionally, the server 104 can use the second session key to decipher communications received from the client device 102 during the second communication session. For example, the server 104 can use the second session key to decrypt the first communication received from the client device 102.

In some alternative implementations, the server 104 can use the selected nonce to generate a third session key that is different from the second session key. For example, the server 104 can generate the third session key using the selected nonce and a public key associated with the client device 102. In this example, the server 104 can use the second session key to decipher communications received from the client device 102 and the third session key to encrypt communications for transmission to the client device 102.

In some implementations, the server 104 verifies the validity of the selected nonce. The server 104 can verify the validity of the selected nonce by determining if the selected nonce has been used in a previous communication session. For example, the set of nonces can be stored in a look-up table in the database 110. The server 104 can edit the look-up table to indicate when nonces in the set of nonces have been used. Upon receiving or identifying the selected nonce, the server 104 can look up the selected nonce in the look-up table to determine if the selected nonce has been used in a previous communication session. If the selected nonce has been used in a previous communication session, the server 104 can determine that the selected once is not valid. If the selected nonce has not been used in a previous communication session, the server 104 can determine that the selected nonce is valid.

As another example, the server 104 can edit metadata associated with each nonce in the set of nonces when the nonces are used in a communication session to indicate that the nonces have been used. In this example, metadata associated with each nonce can be set to valid as a default. When a nonce is used in a communication session, the server 104 can edit the metadata to indicate that the nonce is invalid. The server 104 can access metadata associated with the selected nonce to determine if the nonce is valid or invalid.

In some implementations, validity of a nonce can be determined, in whole or in part, based on a validity time associated with the nonce. For example, each nonce in the set of nonces can be given a validity time, or a "valid until" date or time stamp. The validity time, date stamp, or time stamp for each nonce can be stored in a look-up table in the database 110 or as metadata associated with each nonce. The server 104 can look up the validity time, date stamp, or time stamp for the selected nonce to determine if the selected nonce is still valid. For example, the server 104 can receive the indication of the selected nonce at 10:00 am on 11/24/2009. The server 104 can access a look-up table to determine that the validity time stamp for the selected nonce is 12:00 am on 11/01/09. Since the selected nonce was received after the validity time stamp, the server 104 can determine that the selected nonce is invalid. As another example, the server 104 can receive the indication of the selected nonce 23 days after the set of nonces had been provided to the client device 102 by the server 104. The server 104 can access metadata for the selected nonce and identify that the validity time for the selected nonce is 30 days. Since 30 days had not yet elapsed when the indication of the selected nonce was received, the server 104 can determine that the selected nonce is valid.

In some implementations, if the server 104 receives a nonce that is not included in the set of nonces associated with the client device 102, the server 104 can determine that the received nonce is invalid. For example, the third party device 108 can attempt to initiate a communication session with the server 104 where the communication session appears to have been initiated by the client device 102. The third party device 108 can include an indication of a nonce along with an initial communication intended for the server 104. The server 104 can receive the indication of the nonce and use the indication to identify a nonce as described above. If the identified nonce is not included in the set of nonces associated with the client device 102, the server 104 can determine that the identified nonce is not valid.

In instances in which the server 104 determines that the selected nonce is valid, the server 104 can use the selected nonce to generate the second session key and/or third session key as described above. For example, the server 104 can use the master key and the selected nonce to generate the second session key. The server 104 can then use the second session key to encrypt communications intended for the client device 102 and to decrypt communications received from the client device 102 during the second communication session.

The second communication session can be terminated by either the server 104 or the client device 102. For example, the client device 102 can explicitly indicate to the server 104 that the second communication session is to be terminated. As another example, the client device 102 can terminate the second communication session by ending transmissions to the server 104. In this example, the server 104 can determine that the second communication session is terminated after not receiving a communication from the client device 102 for a predetermined time out period. In some implementations, communications encrypted using the second session key (or the third session key in implementations where a third session key in generated) are considered invalid communications after the second communication session has terminated.

In instances in which the server 104 determines that a received nonce is invalid, or that a nonce identified using a received indication of a nonce is invalid, the server 104 can elect to ignore communications associated with the invalid nonce. For example, the third party device 108 can record a communication sent by the client device 102 where the communication includes a nonce. The third party device 108 can later transmit the recorded communication (i.e., replay the recorded communication) to the server 104. The server 104 can identify that the nonce received from the third party device 108 had been used in a previous communication session and determine that the received nonce is invalid. In some implementations, upon identifying that the received nonce is invalid, the server 104 can determine that the communication received from the third party device 108 is a potential replay attack. The server 104 can elect to ignore communications associated with the received nonce as being communications associated with a replay attack.

As another example, the client device 102 can send a first communication to the server 104 that includes an indication of a selected nonce. In this example, is delayed within the network 106 for an unusually long period of time. Upon not receiving a response from the server 104 after a predetermined time out period, the client device 102 resends the first communication as a second communication. The second communication can reach the server 104. The server can use the received indication of the selected nonce to identify the selected nonce, generate a session key from the selected nonce, and enter into a communication session with the client device 102. During the communication session, or after the communication session has terminated, the server 104 can receive the initially sent first communication. The server 104 can use the indication of the selected nonce included in the first communication to identify the selected nonce. The server 104 can then determine that the selected nonce has previously been used to initiate a communication session and is therefore not a valid nonce. The server 104 can then ignore the received first communication as being associated with an invalid nonce.

In some alternative implementations, the set of nonces can be provided to the client device 102 outside of a communication session between the server 104 and the client device 102. For example, the client device 102 can be a cell phone. The set of nonces can be stored in a memory of the cell phone when the cell phone is manufactured. As another example, the client device 102 can be a personal computer and the set of nonces can be transferred to the personal computer using a hard media, such as a CD or DVD.

Figure 2:
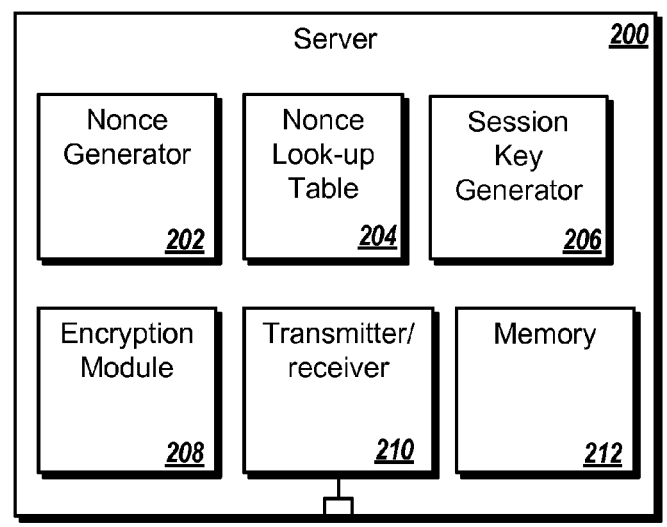
FIG. 2 shows an example server system for generating offline shared security keys.

Referring now to FIG. 2, a server 200 includes a number of components for facilitating secure communications. The server 200 can be implemented in a single system, or across multiple systems. The components included in the server 200 can implemented using hardware or a combination of hardware and software. In some implementations, the functions of some or all of the components of the server 200 can be performed by a single component.

The server 200 includes a nonce generator 202 for generating nonces. For example, the nonce generator 202 can include a random number generator for generating nonces. As another example, a specified formula can be used to generate nonces. The nonces can be used as once use communication session security keys. For example, a nonce can be used in combination with a master key to generate a one time use session key for a communication session between the server 200 and another device. The nonces generated by the nonce generator 202 can be stored in a memory unit 212 of the server 200 or in a database that is external to the server 200.

The server 200 can include a nonce look-up table 204 for storing and organizing nonces. The nonce look-up table 204 can be stored in the memory unit 212 or in a database external to the server 200. In some implementations, some or all of the nonces generated by the nonce generator 202 are stored in the nonce look-up table 204. In some implementations, the nonce look-up table 204 can be populated with nonces from an outside source. For example, nonces can be imported into the nonce look-up table 204 using a DVD-ROM. In some such implementations, the server 200 may not include the nonce generator 202.

The nonce generator 202 can associate additional information with the nonces. For example, the nonce look-up table 204 can be used to organize the nonces into sets of nonces. Each nonce look-up table 204 can be associated with a set ID for a set of nonces. In some implementations, the nonce look-up table 204 can associate index numbers or nonce IDs with the nonces. The index numbers of nonce IDs can be used to identified nonces using nonce indicators received in communications from other devices. The nonce look-up table 204 can additionally be used to store validity information for nonces. For example, the nonce look-up table 204 can be used to determine if a nonce has been used in a previous communication session. If the nonce has been used in a pervious communication session, the server 200 can identify the nonce as an invalid nonce. As another example, a validity time period, date stamp, or time stamp can be associated with each nonce in the nonce look-up table 204.

In some implementations, the nonce look-up table 204 can associate device IDs with the nonces. The device IDs can indicate devices that are associated with the nonces. In some implementations, if a nonce indicator is received from a device that has a device ID that is different from the device ID associated with the nonce indicated by the nonce indicator, the server 200 can identify the nonce as invalid.

The server 200 can provide the nonces stored in the nonce look-up table 204 to devices that are capable of communicating with the server 200. For example, during an initial communication session with a device, the server 200 can select a set of nonces from the nonce look-up table 204 and provide the set of nonces to the device. The server 200 can additionally associate the nonces in the set of nonces with the device by editing data in the nonce look-up table 204. The device can use the nonces in future communication sessions to generate session keys and send encrypted communications. The device can provide nonces from the set of nonces, or indicators of nonces from the set of nonces, to the server 200 when initiating future communication sessions.

The server 200 includes a session key generator 206 for generating a session key. The session key generator 206 can use a nonce received from a device, or a nonce identified using a nonce indicator received from a device, to generate a session key for a communication session. In some implementations, the session key generator 206 is used to generate a unique session key for each communication session involving the server 200. In some implementations, the session key generator 206 can use a public key associated with a device in combination with a nonce to generate a session key for a communication session with the device. In some implementations, the session key generator 206 can use a master key associated with a device in combination with a nonce to generate a session key for a communication session with the device.

In some implementations, the session key generator 206 can generate session keys prior to a communication session. For example, the session key generator 206 can generate session keys using nonces stored in the nonce look-up table 204. The generated nonces can then be stored (for example, in the memory unit 212 or in the nonce look-up table 204) for later retrieval. When a nonce or an indication of a nonce is received from a device, the session key associated with the nonce can be retrieved rather than being generated in real time.

The server 200 includes an encryption module 208 for encrypting and decrypting communications with other devices. For example, the server 200 can receive a communication from a device along with a nonce. The server 200 can determine that the nonce is valid (e.g., using the nonce look-up table 204) and use the session key generator 206 to generate a session key using the nonce. The server 200 can then use the encryption module 208 to decrypt the received communication as well as additionally communications received from the device during a current communication session. The server 200 can additionally use the encryption module 208 to encrypt communications intended for the device.

The server 200 can send the encrypted communications to the device using the transmitter/receiver 210. Additionally, the server 200 can use the transmitter/receiver 210 to provide nonces or sets of nonces to devices that are capable of communicating with the server 200. The transmitter/receiver 210 can also be used to received communications (e.g., encrypted communications) from devices in communication with the server 200.

Figure 3:
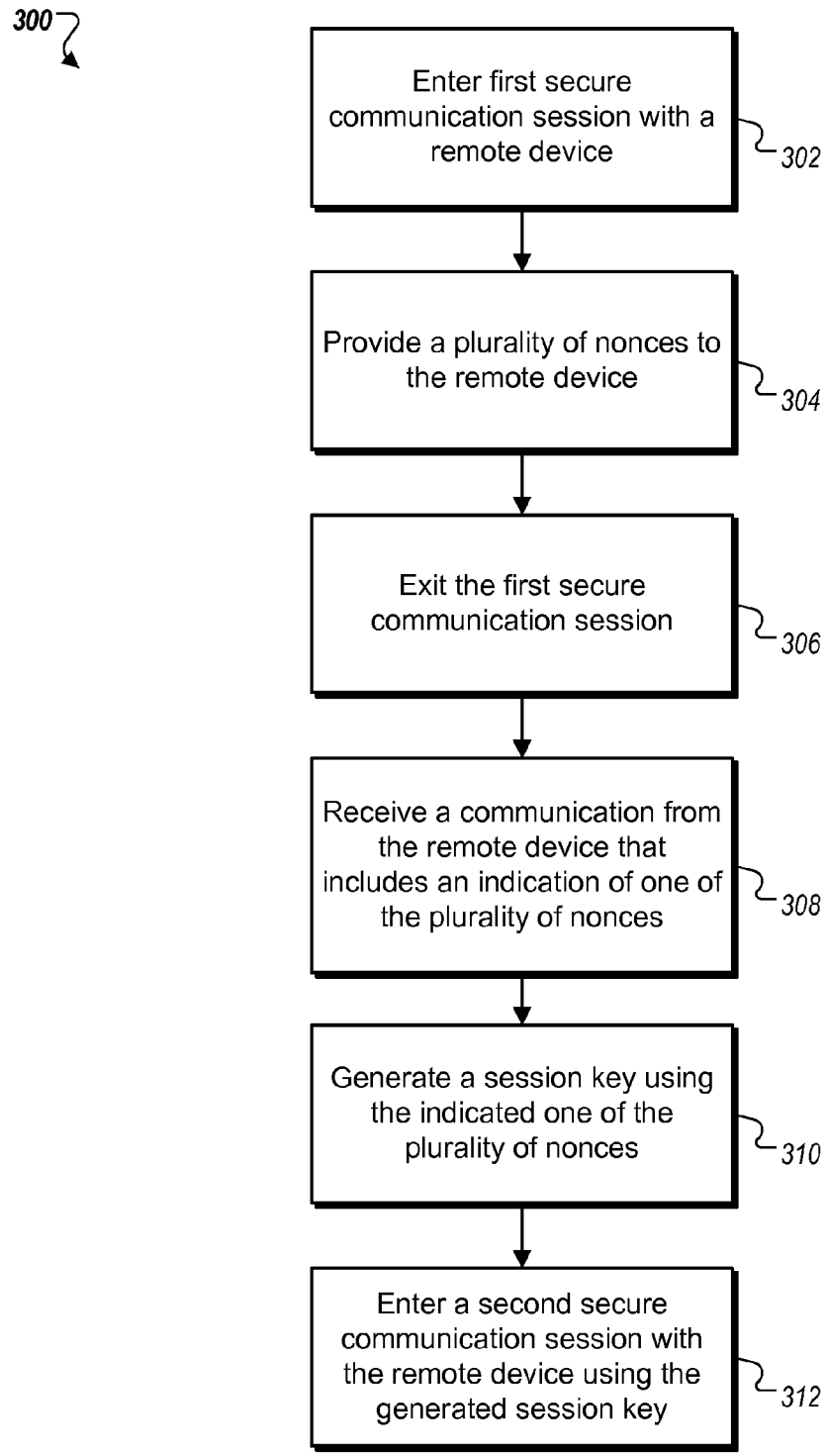
FIG. 3 is a flow diagram of an example technique for participating in a secure communication session.

FIG. 3 shows a flow diagram of a process 300 for participating in a secure communication session. The process 300 can be performed, for example, by the server 104 of FIG. 1 or the server 200 of FIG. 2. In some implementations, the process 300 can be performed by the client device 102 shown in FIG. 1.

A first secure communication session with a remote device is entered (302). For example, a first desktop computer establishes a communication session with a second desktop computer. As another example, a VoIP server enters a communication session with a IP enabled telephone. As yet another example, a web server enters a communication session with a smart phone. In some implementations, the first secure communication session can be a TLS or SSL communication session. In some implementations, a first nonce is received from the remote device and a second nonce is provided to the remote device. The first and second nonces can be used to generate a session key for the first secure communication session.

A plurality of nonces are provided to the remote device (304). For example, a web server (e.g., the server 104 of FIG. 1) can provide a plurality of nonces to a personal computer (e.g., the client device 102 of FIG. 1). The nonces can be randomly generated numbers of codes that are to be used to generate unique session keys for future communication sessions. In some implementations, each nonce is a one use encryption code that is intended to be used in association with a single communication session.

The first secure communication session is then terminated (306). For example, a termination communication can be sent to the remote device to indicate that the first secure communication session is to be terminated. As another example, the remote device can exit the first secure communication session by ending transmissions. If a transmission is not received from the remote device within a predetermined time period, it can be determined that the first secure communication session has been terminated.

A communication that includes an indication of one of the plurality of nonces is received from the remote device (308). For example, a communication that includes a nonce from the plurality of nonces can be received from the remote device. As another example, the a nonce ID can be received from the remote device. The nonce ID can be used to look up the nonce in a database or look-up table (e.g., the nonce look-up table 204 of FIG. 2).

A session key is generated using the indicated one of the plurality of nonces (310). For example, a session key generator (e.g., the session key generator 206 of FIG. 2) can use the indicated nonce and a master key associated with the remote device to generate a session key for a current communication session with the remote device. As another example, a public key for the remote device can be used in combination with the indicated nonce to generate the session key. The session key can be used to encrypt communications intended for the remote device and to decrypt communications received from the remote device.

A second secure communication session with the remote device is entered using the generated session key (312). For example, referring to FIG. 1, the server 104 can enter a second secure communication session with the client device 102 by encrypting a response communication using the generated session key and transmitting the encrypted response communication to the client device 102. As another example, referring to FIG. 2, the server 200 encrypts a communication using the encryption module 208 and transmits the encrypted communication using the transmitter/receiver 210 to the remote device. The server 200 can then use the generated session key to encrypt communications intended for the remote device and decrypt communications received from the remote device until the second secure communication session is terminated.

In some implementations of the process 300, more or fewer steps can be performed or one or more steps can be performed in a different order. For example, the process 300 may additionally include a step of receiving a second communication encrypted using the session key from the remote device.

Figure 4:
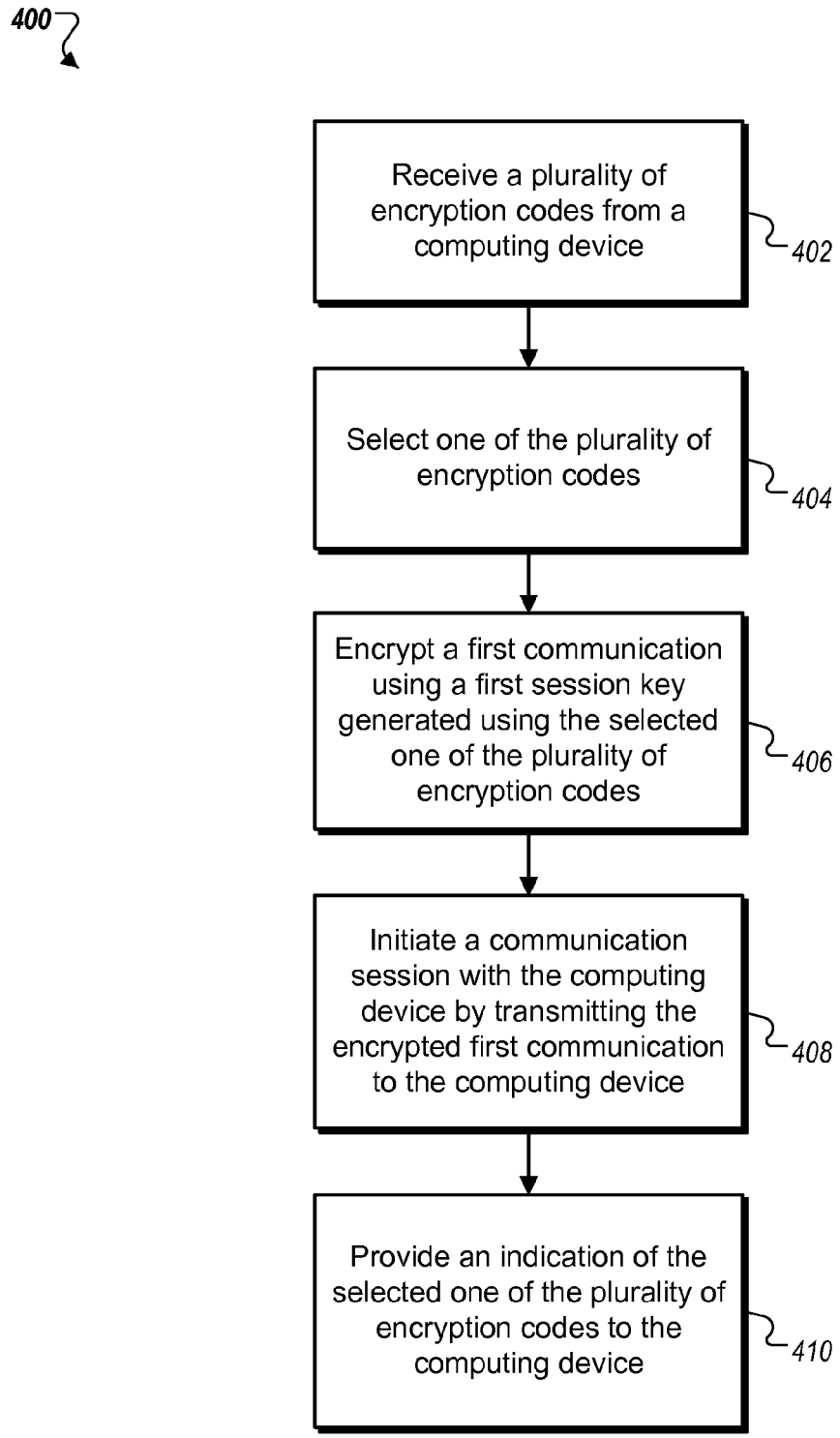
FIG. 4 is a flow diagram of an example technique for initiating a secure communication session.

FIG. 4 shows a flow diagram of a process 400 for initiating a secure communication session. The process 400 can be performed, for example, by the server 104 of FIG. 1 or the client device 102 of FIG. 1. A plurality of encryption codes are received from a computing device (402). For example, a PDA can receive a plurality of encryption codes from an FTP server. The encryption codes can be nonces that are one use encryption codes. In such cases, each encryption code is intended to be used in association with only one communication session. In some implementations, the encryption codes can be used with multiple communication sessions. For example, each encryption code can be used in up to five communication sessions. In some implementations, the received plurality of encryption codes is stored in memory.

One of the plurality of encryption codes is selected (404). For example, an encryption code can be randomly selected from the plurality of encryption codes. As another example, the encryption codes can be used in a predetermined order. For example, the encryption codes can be used in the order in which they were received. As another example, the encryption codes can be used in an order specified by the computing device. In some implementations, a predetermined algorithm is used to select an encryption code from the plurality of encryption codes.

A first communication is encrypted using a first session key generated using the selected one of the plurality of encryption codes (406). For example, a session key can be generated using the selected encryption code and a master key associated with the computing device. The session key can then be used to encrypt the first communication. As another example, a session key that has been generated using the selected encryption code can be received (e.g., over a network, or from a CD or DVD). The received session key can be used to encrypt the first communication. In some implementations, the first communication includes payload data (e.g., voice communication data, web page data, e-mail data, etc.).

A communication session is initiated with the computing device by transmitting the encrypted first communication to the computing device (408). For example, referring to FIG. 1, the client device 102 initiates a communication session with the server 104 by transmitting an encrypted communication to the server 104 through the network 106. As another example, the encrypted first communication can be sent by a mobile device to the server 200 of FIG. 2.

An indication of the selected one of the plurality of encryption codes is provided to the computing device (410). For example, the selected encryption code can be provided to the computing device. As another example, a unique ID associated with the encryption code can be provided to the computing device. As yet another example, an index number associated with the encryption code can be provided to the computing device. In some implementations, the indication of the selected encryption code is provided to the computing device along with the encrypted first communication. In other implementations, the indication of the selected encryption code is provided to the computing device in a communication that is separate from the encrypted first communication. For example, the indication of the selected encryption code can be transmitted to the computing device before or after the encrypted first communication is transmitted to the computing device.

In some implementations of the process 400, more or fewer steps can be performed or one or more steps can be performed in a different order. For example, the process 400 may additionally include a step of receiving a communication encrypted using the first session key from the computing device. As another example, the step of providing the indication of the selected one of the plurality of encryption codes to the computing device can be performed before the step of initiating the communication session with the computing device by transmitting the encrypted first communication to the computing device or before the step of encrypting the first communication using the first session key generated using the selected one of the plurality of encryption codes.

Figure 5:
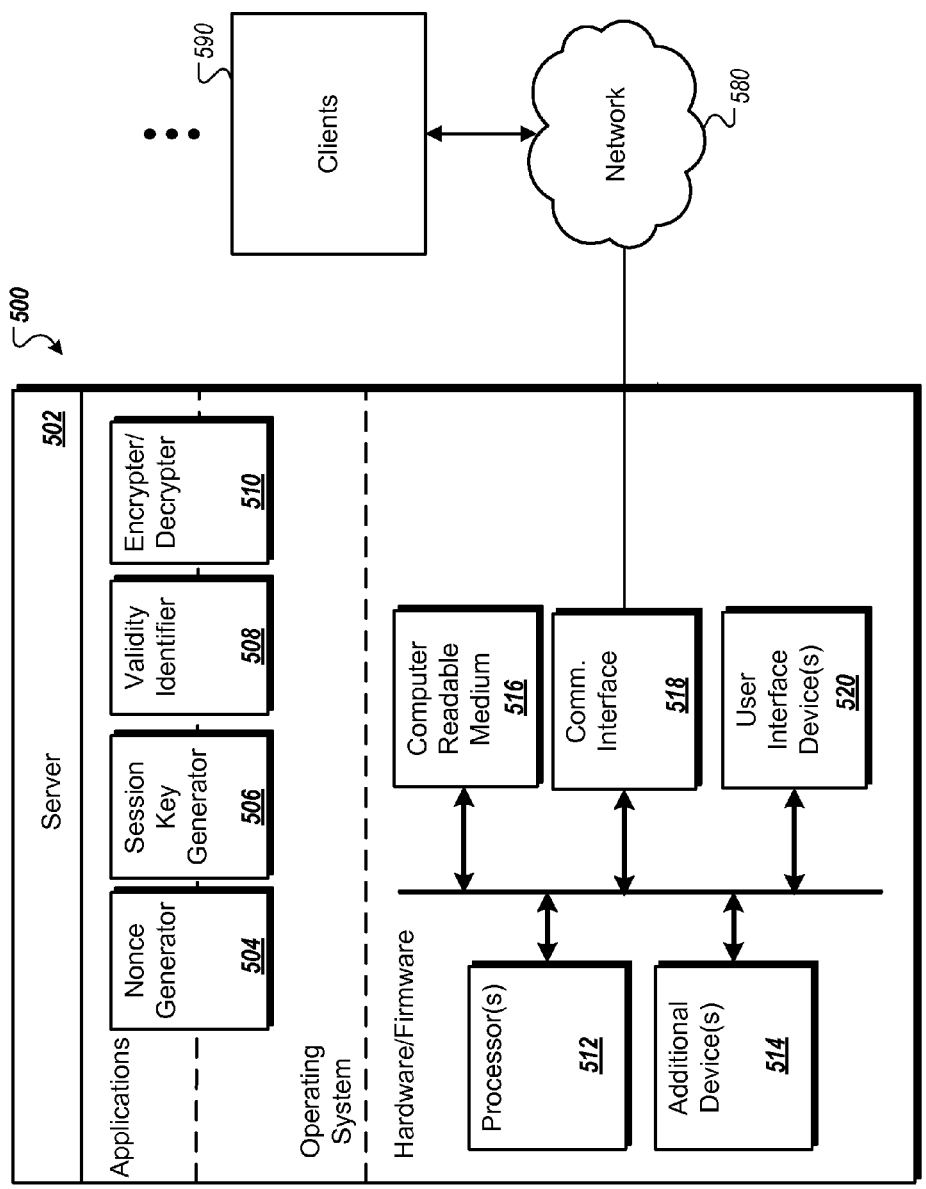
FIG. 5 is a schematic diagram of an example system configured to facilitate a secure communication session.

FIG. 5 is a schematic diagram of an example system configured to participate in secure communications. The system generally consists of a server 502. The server 502 is optionally connected to one or more user or client computers 590 through a network 580. The server 502 consists of one or more data processing apparatus. While only one data processing apparatus is shown in FIG. 5, multiple data processing apparatus can be used. The server 502 includes various modules, e.g. executable software programs, including an nonce generator 504 for generating nonces to be used to generate unique session keys for communications between the server 502 and the client computers 590. A session key generator is used to generate session keys using nonces. For example, the session key generator 506 can generate session keys from nonces generated by the nonce generator 504, or from nonces provided by or indicated by one of the client computers 590. A validity identifier 508 determines if nonces provided by or indicated by one of the client computers 590 are valid (e.g., if the nonces have been used in previous communication sessions). An encrypter/decrypter 510 encrypts communications intended for one of the client computers 590 using a session key generated by the session key generator and decrypts communications received from the one of the client computers 590 using the session key or a different session key generated by the session key generator 506.

Each module runs as part of the operating system on the server 502, runs as an application on the server 502, or runs as part of the operating system and part of an application on the server 502, for instance. Although several software modules are illustrated, there may be fewer or more software modules. Moreover, the software modules can be distributed on one or more data processing apparatus connected by one or more networks or other suitable communication mediums.

The server 502 also includes hardware or firmware devices including one or more processors 512, one or more additional devices 514, a computer readable medium 516, a communication interface 518, and one or more user interface devices 520. Each processor 512 is capable of processing instructions for execution within the server 502. In some implementations, the processor 512 is a single or multi-threaded processor. Each processor 512 is capable of processing instructions stored on the computer readable medium 516 or on a storage device such as one of the additional devices 514. The server 502 uses its communication interface 518 to communicate with one or more computers 590, for example, over a network 580. Examples of user interface devices 520 include a display, a camera, a speaker, a microphone, a tactile feedback device, a keyboard, and a mouse. The server 502 can store instructions that implement operations associated with the modules described above, for example, on the computer readable medium 516 or one or more additional devices 514, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method to be performed by one or more processors, the method comprising:

establishing a first secure communication session with a remote device;

determining a nonce sequence, the nonce sequence specifying an ordered plurality of nonce identifiers;

providing, to the remote device through the first secure communication session, a plurality of nonces and the nonce sequence to be used by the remote device for subsequent communication sessions;

terminating the first secure communication session;

receiving a communication from the remote device after terminating the first communication session, the communication including an initial nonce identifier in the nonce sequence;

determining that a nonce identified by the initial nonce identifier is a valid nonce based on determining that the nonce had not been used in a previous communication session;

generating a session key using the nonce; and establishing a second secure communication session with the remote device using the generated session key.

2. The method of claim 1, wherein determining that the nonce identified by the initial nonce identifier is a valid nonce comprises determining if the nonce is in a collection of previously used nonces.

3. The method of claim 1, wherein the second secure communication session is a Secure Sockets Layer (SSL) communication session.

4. The method of claim 1, wherein the second secure communication session is a Transport Layer Security (TLS) communication session.

5. A computer-implemented method to be performed by one or more processors, the method comprising:

receiving, from a computing device, a plurality of encryption codes and an encryption code sequence, the encryption code sequence specifying an ordered plurality of encryption code identifiers;

selecting an initial encryption code identifier in the encryption code sequence;

encrypting a first communication using a first session key generated using an encryption code corresponding to the selected encryption code identifier;

establishing a communication session with the computing device by transmitting the encrypted first communication to the computing device; and providing an indication of the encryption code corresponding to the selected encryption code identifier to the computing device; and receiving a communication from the computing device wherein the received communication has been encrypted using a second session key generated using an encryption code corresponding to an encryption code identifier that is different from the selected encryption code identifier.

6. The method of claim 5, wherein the indication of the encryption code corresponding to the selected encryption code identifier is transmitted with the encrypted first communication.

7. The method of claim 5, wherein the indication is the encryption code.

8. The method of claim 5, wherein the indication the selected encryption code identifier.

9. The method of claim 5, further comprising receiving a communication from the computing device wherein the received communication has been encrypted using the first session key.

10. The method of claim 5, wherein the communication session is a Secure Sockets Layer (SSL) communication session.

11. The method of claim 5, wherein the communication session is a Transport Layer Security (TLS) communication session.

12. A system comprising one or more computers programmed to perform operations comprising:

establishing a first secure communication session with a remote device;

determining a nonce sequence, the sequence specifying an ordered plurality of nonce identifiers;

providing, to the remote device through the first secure communication session, a plurality of nonces and the nonce sequence to be used by the remote device for subsequent communication sessions;

terminating the first secure communication session;

receiving a communication from the remote device after terminating the first communication session, the communication including an initial nonce identifier in the sequence;

determining that a nonce identified by the initial nonce identifier is a valid nonce based on determining that the nonce had not been used in a previous communication session;

generating a session key using the nonce; and establishing a second secure communication session with the remote device using the generated session key.

13. The system of claim 12, wherein determining that the nonce identified by the initial nonce identifier is a valid nonce comprises determining if the nonce is in a collection of previously used nonces.

14. The system of claim 12, wherein the second secure communication session is a Secure Sockets Layer (SSL) communication session.

15. The system of claim 12, wherein the second secure communication session is a Transport Layer Security (TLS) communication session.

* * * * *

UNITED STATES PATENT AND TRADEMARK OFFICE
CERTIFICATE OF CORRECTION

| | | |
|---|---|---|
| PATENT NO. | : 8,615,651 B1 | Page 1 of 1 |
| APPLICATION NO. | : 12/781508 | |
| DATED | : December 24, 2013 | |
| INVENTOR(S) | : Nagendra Modadugu and Bennet S. Yee | |

It is certified that error appears in the above-identified patent and that said Letters Patent is hereby corrected as shown below:

In the Claims

Column 18, line 3, Claim 8, after "wherein the indication", please add "is"

Signed and Sealed this
Eighth Day of April, 2014

Michelle K. Lee
*Deputy Director of the United States Patent and Trademark Office*